United States Patent
Kim et al.

(10) Patent No.: US 12,045,476 B2
(45) Date of Patent: Jul. 23, 2024

(54) STORAGE DEVICES, STORAGE CONTROLLERS, AND OPERATING METHODS OF STORAGE CONTROLLERS

(71) Applicant: Samsung Electronics Co., Ltd., Suwon-si (KR)

(72) Inventors: Chanha Kim, Hwaseong-si (KR); Gyeongmin Nam, Seoul (KR); Seungryong Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 17/586,896

(22) Filed: Jan. 28, 2022

(65) Prior Publication Data

US 2023/0036841 A1   Feb. 2, 2023

(30) Foreign Application Priority Data

Jul. 29, 2021   (KR) .......................... 10-2021-0100137

(51) Int. Cl.
G06F 3/06   (2006.01)

(52) U.S. Cl.
CPC .......... *G06F 3/0631* (2013.01); *G06F 3/0611* (2013.01); *G06F 3/064* (2013.01); *G06F 3/0659* (2013.01); *G06F 3/0679* (2013.01)

(58) Field of Classification Search
CPC ...... G06F 3/0631; G06F 3/0611; G06F 3/064; G06F 3/0659; G06F 3/0679
USPC ........................................................ 711/154
See application file for complete search history.

(56) References Cited

U.S. PATENT DOCUMENTS

| | | | |
|---|---|---|---|
| 7,844,772 B2 | 11/2010 | Moon et al. | |
| 9,437,815 B1* | 9/2016 | Kwan ................. | H10N 70/841 |
| 9,519,576 B2 | 12/2016 | Seo et al. | |
| 9,837,153 B1 | 12/2017 | Rajamohanan et al. | |
| 9,959,067 B2 | 5/2018 | Yang et al. | |
| 10,002,073 B2 | 6/2018 | Cai et al. | |
| 10,310,924 B2 | 6/2019 | Jei et al. | |
| 10,871,910 B1 | 12/2020 | Alrod et al. | |
| 2011/0219177 A1 | 9/2011 | Kanno et al. | |
| 2017/0177425 A1* | 6/2017 | Jei ......................... | G06F 11/076 |

(Continued)

FOREIGN PATENT DOCUMENTS

KR   102113212 B1   5/2020

OTHER PUBLICATIONS

Ghose, Saugata "Modeling and Mitigating Early Retention Loss and Process Variation in 3D Flash" Carnegie Mellon University (Aug. 7, 2019).

*Primary Examiner* — Gautam Sain
(74) *Attorney, Agent, or Firm* — Myers Bigel, P.A.

(57) ABSTRACT

Provided are a storage device, a storage controller, and an operating method of the storage controller. The storage device according to the inventive concept includes a non-volatile memory and a storage controller. The non-volatile memory includes a plurality of memory blocks, each memory block includes physical units having different retention strengths due to process variations, and the retention strengths respectively correspond to times that physical units retain data before respective reclaim operations for the physical units. The storage controller receives a write request and data from a host, selects a first physical unit based on hotness of data and retention strengths, and controls the non-volatile memory to write data to the first physical unit.

20 Claims, 16 Drawing Sheets

(56) References Cited

U.S. PATENT DOCUMENTS

| | | | | |
|---|---|---|---|---|
| 2018/0150233 A1* | 5/2018 | Hanzawa | ............... | G06F 3/0619 |
| 2019/0179698 A1* | 6/2019 | Liu | ....................... | G06F 3/0679 |
| 2020/0319803 A1* | 10/2020 | Wang | .................... | G06F 3/0616 |

* cited by examiner

FIG. 7

| LOGICAL ADDRESS | ACCESS FREQUENCY | HOTNESS LEVEL (HL) |
|---|---|---|
| ADDR1 | A | HL1 |
| ADDR2 | B | HL2 |
| ADDR3 | C | HL3 |
| ... | ... | ... |

FIG. 8

| PHYSICAL UNIT | RETENTION STRENGTH | RETENTION STRENGTH GROUP |
|---|---|---|
| PU1 | $r_1$ | RSG1 |
| PU2 | $r_2$ | RSG2 |
| PU3 | $r_3$ | RSG3 |
| PU4 | $r_4$ | RSG4 |
| ... | ... | ... |

FIG. 9

| PHYSICAL UNIT (BLK, WL) | RETENTION STRENGTH | RETENTION STRENGTH GROUP |
|---|---|---|
| (1, 1) | $r_a$ | RSG1 |
| (1, 2) | $r_b$ | RSG2 |
| ... | ... | ... |
| (z, n) | $r_c$ | RSG3 |

FIG. 10

| PHYSICAL UNIT (BLK, PG) | RETENTION STRENGTH | RETENTION STRENGTH GROUP |
|---|---|---|
| (1, 1) | $r_d$ | RSG1 |
| (1, 2) | $r_e$ | RSG2 |
| ... | ... | ... |
| (z, m) | $r_f$ | RSG3 |

STORAGE DEVICES, STORAGE CONTROLLERS, AND OPERATING METHODS OF STORAGE CONTROLLERS

CROSS-REFERENCE TO RELATED APPLICATION

This application is based on and claims priority under 35 U.S.C. § 119 to Korean Patent Application No. 10-2021-0100137, filed on Jul. 29, 2021, in the Korean Intellectual Property Office, the disclosure of which is incorporated by reference herein in its entirety.

BACKGROUND

The present disclosure relates to memory devices. As a non-volatile memory, flash memory may retain stored data even when power is interrupted. Recently, storage devices including flash memories like an embedded multi-media card (eMMC), a universal flash storage (UFS), a solid state drive (SSD), and a memory card have been widely used, and these storage devices are useful for storing or transporting a large amount of data. Moreover, demand has increased for storage devices having high performance and high reliability.

SUMMARY

The inventive concept provides a storage device capable of improving its lifespan and performance by reducing a reclaim amount, a storage controller, and an operating method of the storage controller.

According to an aspect of the inventive concept, there is provided a storage device including a non-volatile memory including a plurality of memory blocks each including physical units having different retention strengths due to process variations; and a storage controller configured to receive a write request and data from a host, select a first physical unit based on hotness of the data and the retention strengths, and control the non-volatile memory to write the data in the first physical unit, wherein the retention strengths correspond to times for which the physical units retain data before respective reclaim operations for the physical units.

According to another aspect of the inventive concept, there is provided an operating method of a storage controller for controlling a non-volatile memory, the operating method including storing retention strength information including a plurality of retention strengths respectively corresponding to a plurality of physical units included in the non-volatile memory; receiving a write request and data from a host; determining hotness of the data as a first hotness level from among a plurality of hotness levels based on the write request; and allocating a first physical unit corresponding to the first hotness level from among the physical units as a writing space of the data based on the retention strength information.

According to another aspect of the inventive concept, there is provided a storage controller for controlling a non-volatile memory, the storage controller including a host interface configured to receive a write request and data from a host; a hotness determiner configured to determine hotness of the data as a first hotness level from among a plurality of hotness levels based on the write request; a physical unit manager configured to store retention strength information including retention strengths respectively corresponding to physical units included in the non-volatile memory; and an allocator configured to allocate a first physical unit corresponding to the first hotness level from among the physical units as a writing space of the data based on the retention strength information, wherein the retention strengths corresponding to the physical units are different from one another due to process variations of the non-volatile memory.

BRIEF DESCRIPTION OF THE DRAWINGS

Embodiments of the inventive concept will be more clearly understood from the following detailed description taken in conjunction with the accompanying drawings in which:

FIG. 7 shows a hotness level table according to an embodiment of the inventive concept;

FIG. 8 is a retention strength table representing retention strength groups corresponding to physical units according to an example embodiment of the inventive concept;

FIG. 9 is a table representing retention strength groups corresponding to word lines according to an example embodiment of the inventive concept;

FIG. 10 is a table representing retention strength groups corresponding to pages according to an example embodiment of the inventive concept;

DETAILED DESCRIPTION

Figure 1:
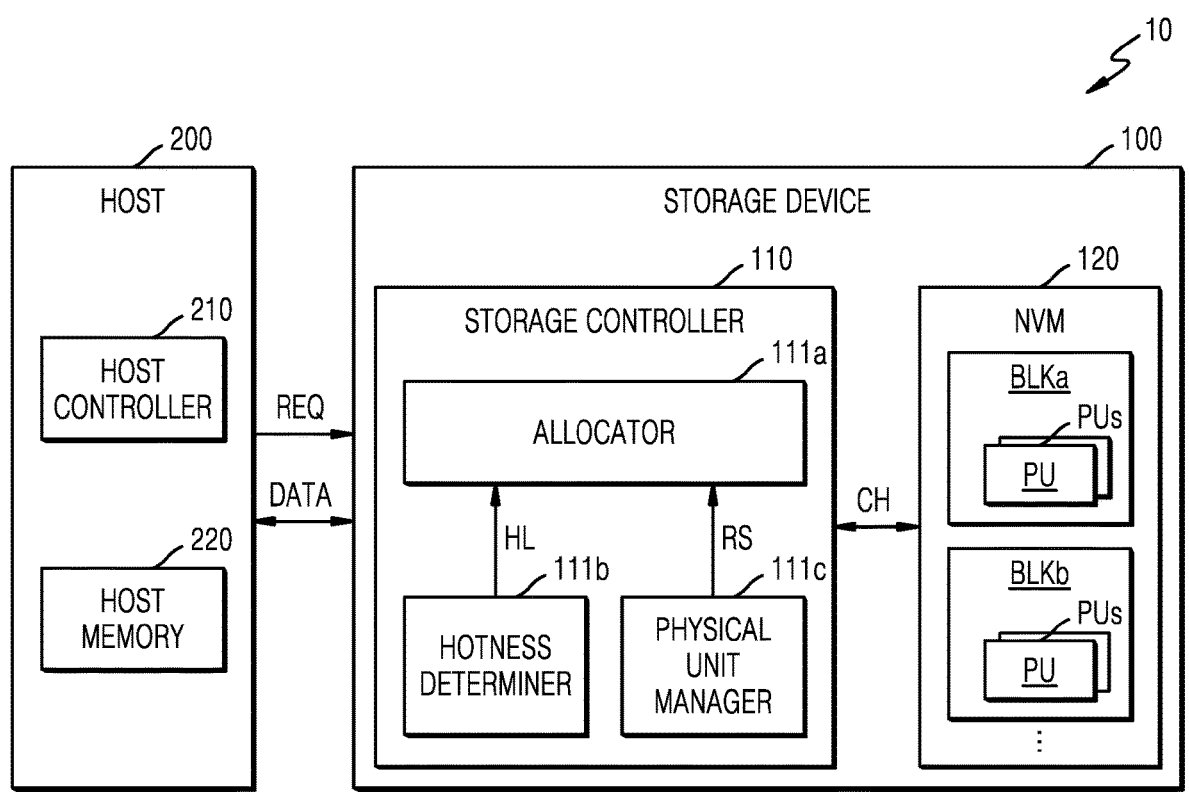
FIG. 1 is a block diagram showing a storage system according to an embodiment of the inventive concept.

FIG. 1 is a block diagram showing a storage system 10 according to an embodiment of the inventive concept.

Referring to FIG. 1, the storage system 10 may include a storage device 100 and a host 200, and thus, the storage system 10 may be referred to as a host-storage system. The storage device 100 may include a storage controller 110 and a non-volatile memory (NVM) 120, and the storage controller 110 and the NVM 120 may be connected to each other through a channel CH. According to some embodiments, the storage controller 110 may be referred to as a controller, a device controller, or a memory controller. According to some embodiments, the NVM 120 may be implemented with a plurality of memory chips or a plurality of memory dies. For example, the memory chips may each be a dual die package (DDP), a quadruple die package (QDP), or an octuple die package (ODP).

The host 200 may include a host controller 210 and a host memory 220. The host memory 220 may function as a buffer memory for temporarily storing data DATA to be transmitted to the storage device 100 or data DATA transmitted from the storage device 100. According to an embodiment, the host controller 210 may be one of a plurality of modules included in an application processor (AP), and the AP may be implemented as a system-on-chip (SoC). The host memory 220 may be an embedded memory provided in an AP or a non-volatile memory or a memory module disposed outside the AP.

The storage controller 110 may control the NVM 120 to write data DATA to the NVM 120 in response to a write request REQ from the host 200. Also, the storage controller 110 may control the NVM 120 to read data DATA stored in the NVM 120 in response to a read request from the host 200. Therefore, the storage device 100 may include storage media for storing data DATA in response to the write request REQ from the host 200. As an example, the storage device 100 may include at least one of an SSD, an embedded memory, and a removable external memory. For example, when the storage device 100 is an SSD, the storage device 100 may be a device complying with the non-volatile memory express (NVMe) standard. For example, when the storage device 100 is an embedded memory or an external memory, the storage device 100 may be a device complying with the universal flash storage (UFS) standard or the embedded multi-media card (eMMC) standard. The host 200 and the storage device 100 may generate and transmit packets according to standard protocols employed thereby, respectively.

The NVM 120 includes a plurality of memory blocks including memory blocks BLKa and BLKb, wherein the memory blocks BLKa and BLKb may each include physical units PUs. For example, it may be defined that a physical unit PU corresponds to a physical address. According to an embodiment, the physical unit PU may include a word line. According to an embodiment, the physical unit PU may include a page, and a word line may correspond to at least one page. For example, when a memory cell is a single level cell (SLC), a word line may correspond to one page. As another example, when the memory cell is a multi-level cell (MLC), a word line may correspond to two pages. In a further example, when the memory cell is a triple level cell (TLC), a word line may correspond to three pages. As yet another example, when the memory cell is a quadruple level cell (QLC), a word line may correspond to four pages.

The physical units PUs may have different retention strengths due to process variation. Here, it may be defined that the "retention strength" corresponds to a time that the physical unit PU retains data before a reclaim operation for the physical unit PU. Here, the "reclaim operation" refers to an operation of moving data in a source region (e.g., a source block) to another target region or a destination region (e.g., a target block) and erasing the data in the source region to re-use the source region. In detail, valid data stored in the source region may be read, and the read valid data may be programmed in another destination region. Therefore, an address corresponding to the valid data in a mapping table may be changed from an address of a source region to an address of a target region. According to some embodiments, the retention strength may be referred to as retention intensity. The retention strength is described below in detail with reference to FIG. 2A.

Figure 2A:
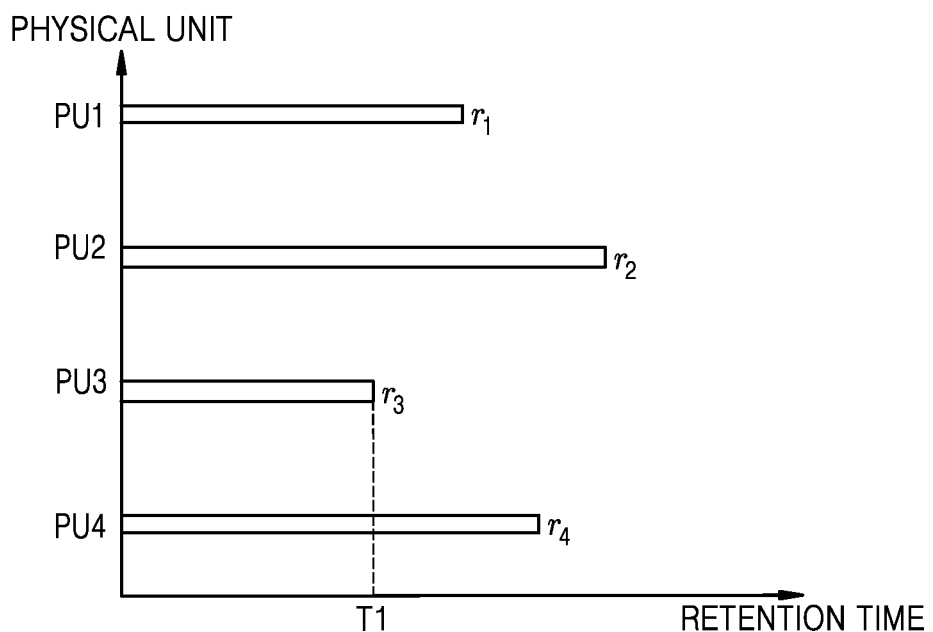
FIG. 2A is a graph for describing a retention strength according to an example embodiment of the inventive concept.

FIG. 2A is a graph for describing a retention strength according to an embodiment of the inventive concept.

Referring to FIG. 2A, the horizontal axis represents a retention time, and the vertical axis represent a physical unit, that is, a physical unit index. A first physical unit PU1 has a first retention strength $r_1$, and thus the first physical unit PU1 may retain data during a time corresponding to the first retention strength $r_1$. A second physical unit PU2 has a second retention strength $r_2$, and thus, the second physical unit PU2 may retain data during a time corresponding to the second retention strength $r_2$. A third physical unit PU3 has a third retention strength $r_3$, and thus, the third physical unit PU3 may retain data during a time corresponding to the third retention strength $r_3$. A fourth physical unit PU4 has a fourth retention strength $r_4$, and thus, the fourth physical unit PU4 may retain data during a time corresponding to the fourth retention strength $r_4$. For example, the unit of each retention strength may be an arbitrary unit (AU).

As described above, a retention strength corresponds to a time a physical unit retains data before a reclaim operation for the corresponding physical unit. For example, from among the first physical unit PU1, the second physical unit PU2, the third physical unit PU3, and the fourth physical unit PU4, the third physical unit PU3 having the lowest retention strength may retain data for a first time T1. When the first time T1 is elapsed after data is written to the third physical unit PU3, a reclaim operation for the third physical unit PU3 may be performed.

For example, an amount of reclaim generation for the first physical unit PU1 may be expressed as $$\frac{1}{r_1},$$

an amount of reclaim generation for the second physical unit PU2 may be expressed as $$\frac{1}{r_2},$$

an amount of reclaim generation for the third physical unit PU3 may be expressed as $$\frac{1}{r_3},$$

and an amount or reclaim generation for the fourth physical unit PU4 may be expressed as $$\frac{1}{r_4}.$$

Therefore, the total reclaim amount for the first physical unit PU1, the second physical unit PU2, the third physical unit PU3, and the fourth physical unit PU4 may be expressed as Equation 1 below.

$$\text{Total reclaim} = \frac{1}{r_1} + \frac{1}{r_2} + \frac{1}{r_3} + \frac{1}{r_4} \quad \text{[Equation 1]}$$

Referring back to FIG. 1, the storage controller 110 may receive a write request REQ and data DATA from the host 200. For example, the write request REQ and the data DATA may be sequentially received. As another example, the write request REQ and the data DATA may be received substantially simultaneously. In some embodiments, the write request REQ and the data DATA may be transmitted through different signal lines, respectively. In other embodiments, the write request REQ and the data DATA may be transmitted through the same signal line.

The storage controller 110 may select one of the physical units PUs based on the hotness of data DATA and the retention strengths of the physical units PUs and control the NVM 120 to write the data DATA to a selected physical unit PU. In detail, the storage controller 110 may perform block allocation or address mapping, such that hot data, which is data frequently updated or written to the same logical address, is written to a weak physical unit having a relatively low retention strength.

The storage controller 110 may select a physical unit, such that data DATA is allocated to a physical unit having a relatively low retention strength as the hotness (of the data DATA) is high, and select a physical unit, such that data DATA is allocated to a physical unit having a relatively high retention strength as the hotness (of the data DATA) is low. For example, the storage controller 110 may be configured to select a first physical unit, for allocation of the data DATA to the first physical unit, as (a) a physical unit having a low retention strength, in response to high hotness, and may be configured to select the first physical unit, for allocation of the data DATA thereto, as (b) a physical unit having a high retention strength, in response to low hotness. A physical unit in which frequently changed hot data is stored may exhibit a different (e.g., faster) erasing time due to the characteristics of a flash memory that is not overwritable. Therefore, when hot data is written to a weak physical unit having a relatively low retention strength, the timing of reclaim occurrence may be delayed, and the total amount of reclaims of the NVM 120 may be reduced.

Here, "hotness" may indicate the possibility of change or update of data. When the hotness is high, it may indicate that the possibility of change is high or updates occur frequently. When the hotness is low, it may indicate that the possibility of change is low or the update does not occur frequently. As such, a type of data like hot data, normal data, or cold data may be determined according to an update time interval of write-requested data.

Figure 2B:
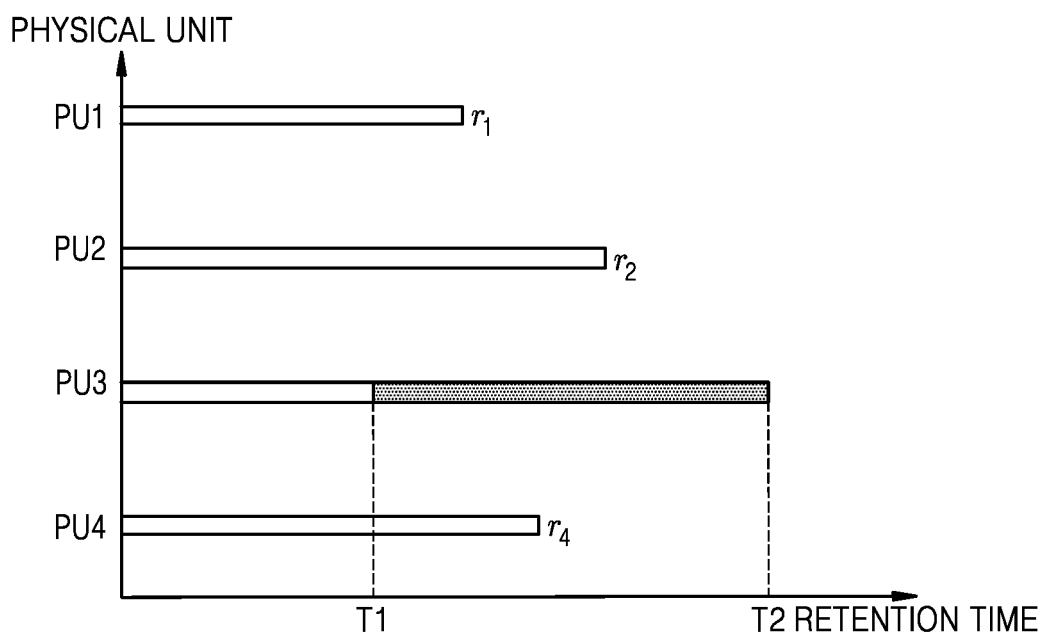
FIG. 2B is a graph showing improvement of a retention time according to an example embodiment of the inventive concept.

FIG. 2B is a graph showing enhancement of retention time according to an embodiment of the inventive concept. Descriptions identical to those already give above with reference to FIG. 2A may be omitted.

Referring to FIGS. 1 and 2B together, to perform a write operation for data DATA having high hotness, the storage controller 110 may allocate the third physical unit PU3 having the lowest retention strength as a storage space for data DATA. Because data DATA having high hotness may be frequently updated, the data DATA stored in the third physical unit PU3 may be updated before a first time T1. Due to the update, the data DATA stored in the third physical unit PU3 may be invalidated before the first time T1, and thus, a reclaim operation for the third physical unit PU3 may not be performed during the first time T1.

For example, during a second time T2 in which a reclaim operation for a memory block including the third physical unit PU3 is performed, the reclaim operation for the third physical unit PU3 may be performed. Therefore, the actual reclaim time for the third physical unit PU3 may be extended in spite of the third retention strength ($r_3$) for the third physical unit PU3, and thus the total amount of reclaims of the NVM 120 may be reduced as compared to previous cases.

For example, when a ratio of hot data written to a weak physical unit like a weak word line or a weak page from among all data received from the host 200 is defined as H, H may be a real number between 0 and 1. For example, when hot data corresponding to H is written in the third physical unit PU3 with the lowest retention strength (i.e., a weak physical unit), the total amount of reclaims may be expressed as shown in Equation 2 below.

$$\text{Total reclaim} = \frac{1}{r_1} + \frac{1}{r_2} + \frac{1}{r_3} * (1-H) + \frac{1}{r_4} \quad \text{[Equation 2]}$$

Compared with Equation 1, the total amount of reclaims in Equation 2 may be reduced. As such, according to embodiments of the inventive concept, the total amount of reclaims of the NVM 120 may be reduced. For example, when H is 0.1, the total reclaim improvement amount may correspond to a first value (e.g., 5%), and, when H is 0.9, the total reclaim improvement amount may correspond to a second value (e.g., 60%), wherein the second value may be greater than the first value. As such, as the amount of hot data written to physical units having low retention strengths from among all data increases, the total amount of reclaims may further decrease.

Referring back to FIG. 1, the storage controller 110 may include an allocator 111a, a hotness determiner 111b, and a physical unit manager 111c. According to embodiments, the allocator 111a, the hotness determiner 111b, and the physical unit manager 111c may be implemented in software, firmware, and/or hardware. Operations of the allocator 111a, the hotness determiner 111b, and the physical unit manager 111c are described below in detail with reference to FIG. 3.

Figure 3:
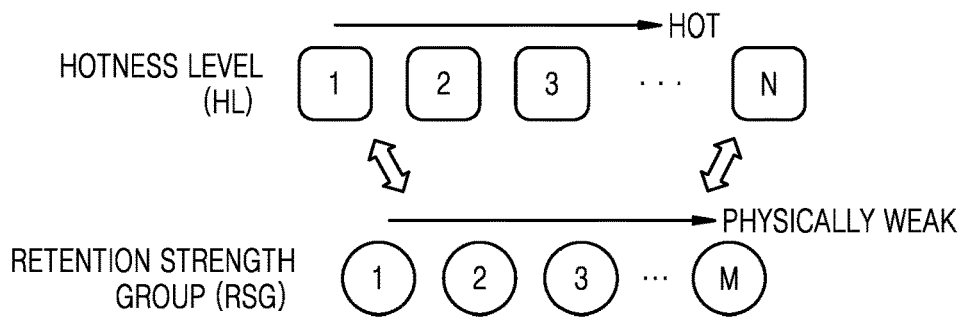
FIG. 3 shows an example of an operation of matching hotness levels to retention strength groups according to an embodiment of the inventive concept.

FIG. 3 shows an example of an operation of matching hotness levels HL to retention strength groups RSG according to an embodiment of the inventive concept.

Referring to FIGS. 1 and 3 together, the hotness determiner 111b may determine the hotness of data as a first hotness level that is one of a plurality of hotness levels HL based on a write request REQ. The write request REQ may include a logical address, and the hotness determiner 111b may determine the hotness level HL of the data DATA based on the logical address included in the write request REQ. For example, the hotness levels HL may include N hotness levels HL, where N may be any positive integer. For example, N may be a positive integer equal to or greater than 3. In this case, the hotness level HL may increase as the hotness of data increases, and the hotness level HL may decrease as the hotness of data decreases. However, the inventive concept is not limited thereto.

The physical unit manager 111c may store retention strength information RS including retention strengths corresponding to physical units PUs included in each of the memory blocks BLKa and BLKb. In an embodiment, the physical unit manager 111c may group retention strengths into a plurality of retention strength groups RSG. For example, the retention strength groups RSG may include M retention strength groups RSG, where M may be any positive integer. For example, M may be a positive integer equal to or greater than 3. At this time, as the retention strength decreases, the retention strength may be included in a retention strength group (e.g., an M-th retention strength group) corresponding to a higher hotness level HL (e.g., an N-th hotness level). Also, as the retention strength increases, the retention strength may be included in a retention strength group (e.g., a first retention strength group) corresponding to a lower hotness level HL (e.g., a first hotness level). However, the inventive concept is not limited thereto.

The allocator 111a may control the NVM 120 to write data DATA to a physical unit having a low retention strength from among the physical units PUs. In detail, the allocator 111a may receive the hotness level HL from the hotness determiner 111b and receive the retention strength information RS from the physical unit manager 111c. The allocator 111a may allocate one physical unit from among a plurality of physical units (one physical unit PU from among the physical units PUs) as a storage space for the data DATA based on the hotness level HL and the retention strength information RS.

Figure 4:
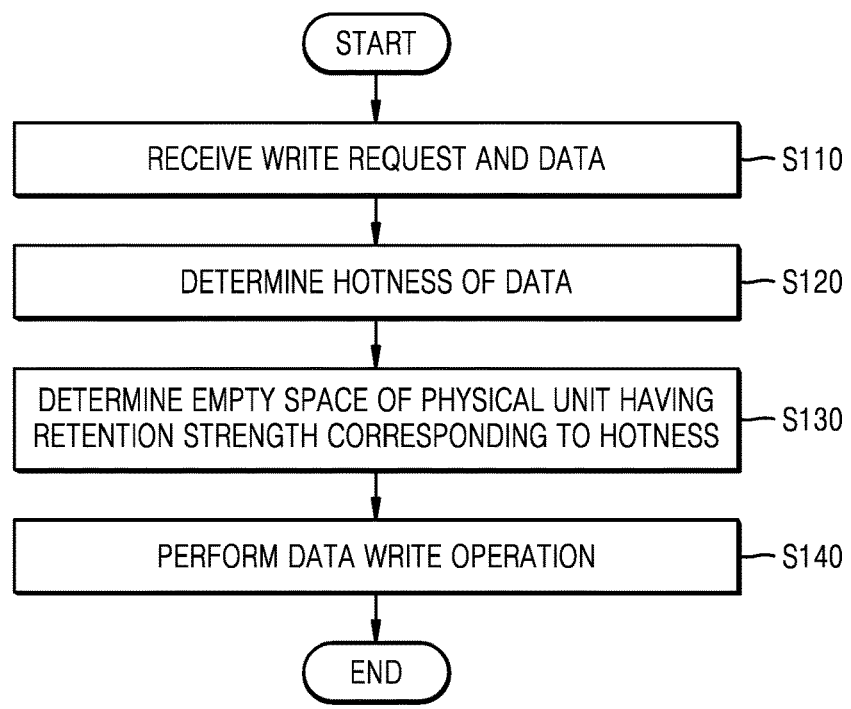
FIG. 4 is a flowchart of an operating method of a storage device according to an embodiment of the inventive concept.

FIG. 4 is a flowchart of an operating method of the storage device 100 according to an embodiment of the inventive concept.

Referring to FIG. 4, the operating method of the storage device 100 is an operating method of the storage device 100 performed in response to the write request REQ from the host 200. Descriptions given above with reference to FIGS. 1 to 3 may also be applied to the present embodiment, and descriptions identical thereto may be omitted.

In operation S110, the storage device 100 receives a write request REQ and data DATA from the host 200. In operation S120, the storage device 100 determines the hotness of the data DATA. For example, the hotness determiner 111b may determine the hotness of the data DATA as one of a plurality of hotness levels. In operation S130, the storage device 100 identifies an empty space of a physical unit having a retention strength corresponding to a determined hotness, that is, a free physical unit. For example, the allocator 111a may select a retention strength group corresponding to the determined hotness based on the retention strength information RS and identify a free physical unit from among physical units included in the selected retention strength group. In operation S140, the storage device 100 performs a data write operation.

Figure 5:
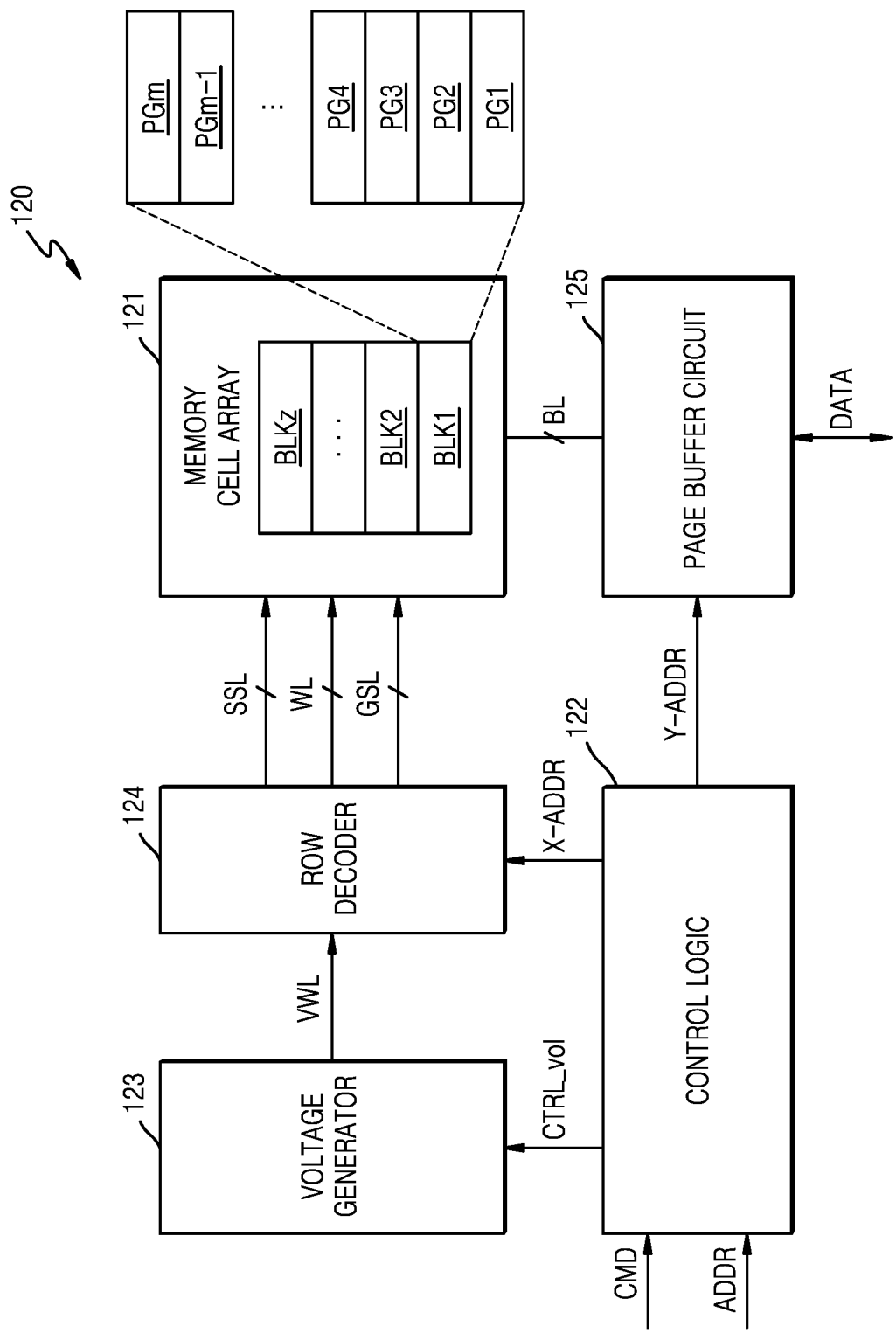
FIG. 5 is a block diagram showing a non-volatile memory according to an embodiment of the inventive concept.

FIG. 5 is a block diagram showing the NVM 120 according to an embodiment of the inventive concept.

Referring to FIG. 5, the NVM 120 may include a memory cell array 121, a control logic circuit 122, a voltage generator 123, a row decoder 124, and a page buffer circuit 125. Although not shown in FIG. 5, the NVM 120 may further include a memory interface circuit and may further include column logic, a pre-decoder, a temperature sensor, a command decoder, an address decoder, etc.

The memory cell array 121 may include a plurality of memory blocks BLK1 to BLKz, and the memory blocks BLK1 to BLKz may each include a plurality of pages PG1 to PGm, wherein z and m may be positive integers and may vary according to embodiments. For example, a memory block may be an erase unit, and a page may be a write/read unit. In some embodiments, the memory blocks BLK1 to BLKz may include the memory blocks BLKa and BLKb of FIG. 1. The memory cell array 121 may be connected to the page buffer circuit 125 through bit lines BL and may be connected to the row decoder 124 through word lines WL, string select lines SSL, and ground select lines GSL.

In an example embodiment, the memory cell array 121 may include a 3-dimensional memory cell array, and the 3-dimensional memory cell array may include a plurality of NAND strings. Each NAND string may include memory cells connected to word lines vertically stacked on a substrate, respectively. Example memory cell arrays are discussed in U.S. Pat. Nos. 7,679,133, 8,553,466, 8,654,587, 8,559,235, and U.S. Patent Application Publication No. 2011/0233648, each of which is incorporated herein in its entirety by reference. In an example embodiment, the memory cell array 121 may include a 2-dimensional memory cell array, and the 2-dimensional memory cell array may include a plurality of NAND strings arranged in row-wise directions and column-wise directions. In some embodiments, the memory cell array 121 may include various other types of non-volatile memories, and thus the NVM 120 may include magnetic RAM (MRAM), spin-transfer torque MRAM, conductive bridging RAM (CBRAM), ferroelectric RAM (FeRAM), phase change RAM (PRAM), resistive RAM, and various other types of memories.

The control logic circuit 122 may provide overall control of various operations in the NVM 120. The control logic circuit 122 may output various control signals in response to a command CMD and/or an address ADDR. For example, the control logic circuit 122 may output a voltage control signal CTRL_vol, a row address X_ADDR, and a column address Y_ADDR. The voltage generator 123 may generate various types of voltages for performing a program operation, a read operation, and an erase operation based on a voltage control signal CTRL_vol. For example, the voltage generator 123 may generate a program voltage, a read voltage, a program verify voltage, or an erase voltage as a word line voltage VWL.

The row decoder 124 may select one of the word lines WL in response to a row address X_ADDR and may select one of the string select lines SSL. For example, the row decoder 124 may apply a program voltage and a program verify voltage to a selected word line during a program operation and may apply a read voltage to a selected word line during a read operation. The page buffer circuit 125 may select at least one bit line BL from among the bit lines BL in response to a column address Y_ADDR. The page buffer circuit 125 may operate as a write driver or a sense amplifier depending on an operation mode.

Figure 6:
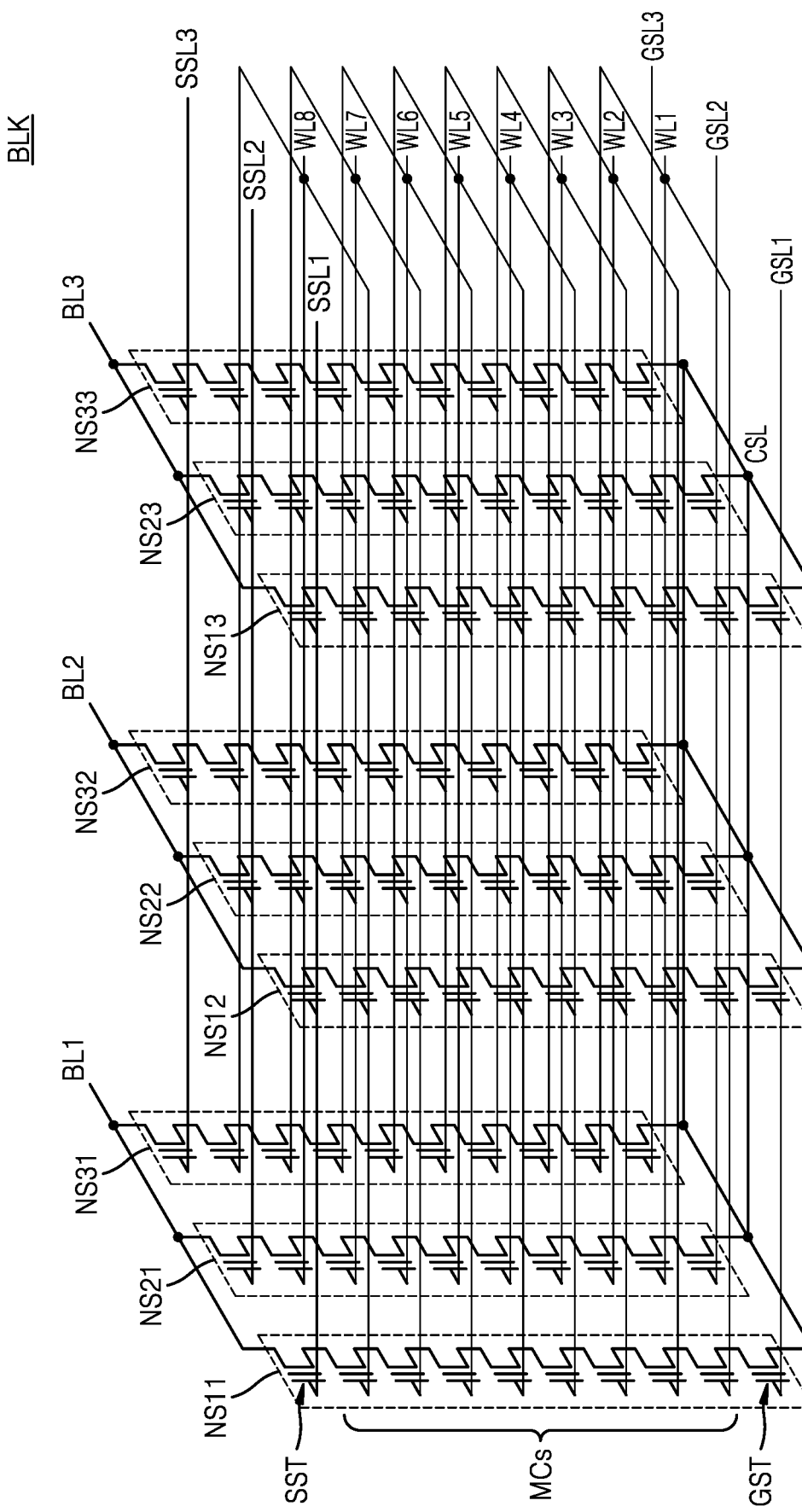
FIG. 6 is a circuit diagram showing a memory block according to an embodiment of the inventive concept.

FIG. 6 is a circuit diagram showing a memory block BLK according to an embodiment of the inventive concept.

Referring to FIG. 6, the memory block BLK may correspond to one of the memory blocks BLK1 to BLKz of FIG. 5. The memory block BLK may include NAND strings NS11 to NS33, and each NAND string (e.g., NS11) may include a string select transistor SST, a plurality of memory cells MCs, and a ground select transistor GST connected in series. The string select transistor SST, the ground select transistor GST, and the memory cells MCs included in each NAND string may form a stacked structure on a substrate in a vertical direction.

Bit lines BL1 to BL3 may extend in a first direction, and word lines WL1 to WL8 may extend in the first direction or a second direction. NAND cell strings NS11, NS21, and NS31 may be provided between a first bit line BL1 and a common source line CSL, NAND cell strings NS12, NS22, and NS32 may be provided between a second bit line BL2 and the common source line CSL, and NAND cell strings NS13, NS23, and NS33 may be provided between a third bit line BL3 and the common source line CSL.

The string select transistor SST may be coupled to corresponding string select lines SSL1 to SSL3. The memory cells MCs may be respectively connected to corresponding word lines WL1 to WL8. The ground select transistor GST may be coupled to corresponding ground select lines GSL1 to GSL3. The string select transistors SST may be respectively connected to a corresponding bit line BL, and the ground select transistor GST may be connected to the common source line CSL. Here, the number of NAND strings, the number of word lines, the number of bit lines, the number of ground select lines, and the number of string select lines may vary according to embodiments.

FIG. 7 shows a hotness level table 71 according to an embodiment of the inventive concept.

Referring to FIGS. 1 and 7 together, the hotness determiner 111b may manage the hotness level table 71 based on the write request REQ. In detail, the hotness determiner 111b may manage access frequencies of a plurality of logical addresses and determine the hotness level HL of data according to the access frequencies. Accordingly, as the number of times the write request REQ is received from the host 200 increases, the hotness determiner 111b may update the access frequencies of the logical addresses and modify the hotness level HL of the data according to updated access frequencies.

For example, the hotness level table 71 may store an access frequency A corresponding to a first logical address ADDR1 and a hotness level HL1 corresponding to the access frequency A. In the same regard, the hotness level table 71 may store an access frequency B corresponding to a second logical address ADDR2 and a hotness level HL2 corresponding to the access frequency B and store an access frequency C corresponding to a third logical address ADDR3 and a hotness level HL3 corresponding to the access frequency C.

According to an example embodiment, the hotness level table 71 may include hotness levels HL corresponding to all logical addresses. According to an example embodiment, all logical addresses may be grouped into a plurality of groups, and the hotness level table 71 may include hotness levels HL corresponding to the groups. According to an example embodiment, the hotness level table 71 may include hotness levels HL corresponding to some logical addresses that are recently received. As such, information included in the hotness level table 71 may vary according to embodiments.

According to an example embodiment, the hotness determiner 111b may include a counter, and thus, the hotness level of data DATA may be determined by counting an access frequency to a logical address included in the write request REQ. For example, the counter may be implemented as software or hardware. According to an example embodiment, the hotness determiner 111b may determine the hotness level of the data DATA by applying a data structure like a hash function or a bloom filter to the write request REQ.

FIG. 8 shows a retention strength table 81 representing retention strength groups corresponding to physical units according to an example embodiment of the inventive concept.

Referring to FIGS. 1, 2A, and 8 together, the physical unit manager 111c may manage the retention strength table 81 storing retention strengths of a plurality of physical units PUs. For example, the first physical unit PU1 may have a first retention strength $r_1$, the second physical unit PU2 may have a second retention strength $r_2$, the third physical unit PU3 may have a third retention strength $r_3$, and the fourth physical unit PU4 may have a fourth retention strength $r_4$. First to fourth retention strengths $r_1$ to $r_4$ may be different from one another according to process variations of first to fourth physical units PU1 to PU4.

Also, the physical unit manager 111c may determine/classify each physical unit PU as one of a plurality of retention strength groups RSG according to the retention strength of the physical unit PU. For example, the first physical unit PU1 may be determined/classified as a first retention strength group RSG1, the second physical unit PU2 may be determined/classified as a second retention strength group RSG2, the third physical unit PU3 may be determined/classified as a third retention strength group RSG3, and the fourth physical unit PU4 may be determined/classified as a fourth retention strength group RSG4.

According to an example embodiment, retention strengths of the physical units PUs may be obtained when a process of manufacturing the NVM 120 is completed. For example, the NVM 120 may correspond to a memory chip, and retention strengths of the physical units PUs may be obtained through post-packaging evaluation of the memory chip. For example, retention strengths of the physical units PUs may be obtained before assembly of the storage device 100.

In detail, the number of error bits of each of the physical units PUs may be measured at a regular time interval, and retention strengths may be obtained based on a measured number of error bits or an increase rate of the number of error bits. For example, a physical unit corresponding to a relatively large increase rate of the number of error bits may be determined/classified as a weak physical unit having a relatively low retention strength. For example, a physical unit corresponding to a relatively small increase rate of the number of error bits may be determined/classified as a strong physical unit or a normal physical unit having a relatively high retention strength.

According to an example embodiment, retention strengths of the physical units PUs may be obtained from (e.g., determined based on information regarding) respective physical locations of the physical units PUs in the NVM 120. For example, a physical location may include a relative distance from an edge portion of a cell region, a relative distance from a substrate, a relative distance from a string select line or a ground select line, etc. As an example, a physical unit disposed at an edge portion of a cell region in which memory cells are formed may be determined/classified as a weak physical unit having a relatively low retention strength, but the inventive concept is not limited thereto. In another example, a physical unit disposed relatively far from the substrate, that is, a physical unit disposed far from the substrate in a vertical direction in a vertical memory device, may be determined/classified as a weak physical unit having a relatively low retention strength, but the inventive concept is not limited thereto.

According to an example embodiment, retention strengths of the physical units PUs may be obtained from (e.g., determined based on) operating voltage conditions of the respective physical units PUs. For example, the operating voltage condition may include a program voltage condition, a read voltage condition, an erase voltage condition, a program verify voltage condition, a read verify voltage condition, and an erase verify voltage condition, but the inventive concept is not limited thereto. As an example, a physical unit having a relatively high program voltage level may be determined/classified as a weak physical unit having a low retention strength, but the inventive concept is not limited thereto.

Retention strengths obtained (e.g., determined) in advance according to the various embodiments described above may be stored in the NVM 120 and may be loaded into a memory of the storage controller 110 from the NVM 120 at a time point at which the storage device 100 is powered on. The physical unit manager 111c may manage the physical units PUs corresponding to pre-obtained/pre-determined retention strengths or pre-obtained/predetermined retention strength groups. Accordingly, the storage device 100 may store hot data in a weak physical unit having a relatively low retention strength based on the retention strengths obtained/determined in advance at runtime.

FIG. 9 shows a retention strength table 91 including retention strength groups corresponding to word lines according to an example embodiment of the inventive concept.

Referring to FIGS. 5 and 9 together, the retention strength table 91 may correspond to an example of the retention strength table 81 of FIG. 8, and the descriptions given above with reference to FIG. 8 may be applied to the present embodiment. The memory cell array 121 may include the memory blocks BLK1 to BLKz, and the memory blocks BLK1 to BLKz may each include n word lines (n is a positive integer). According to an example embodiment, a physical unit may correspond to a word line, and the retention strength table 91 may store retention strengths and retention strength groups corresponding to memory blocks and physical units indicated by word line numbers.

FIG. 10 shows a retention strength table 101 including retention strength groups corresponding to pages according to an example embodiment of the inventive concept.

Referring to FIGS. 5 and 10 together, the retention strength table 101 may correspond to an example of the retention strength table 81 of FIG. 8, and the descriptions given above with reference to FIG. 8 may be applied to the present embodiment. The memory cell array 121 may include the memory blocks BLK1 to BLKz, and the memory blocks BLK1 to BLKz may each include m pages. According to an example embodiment, a physical unit may correspond to a page, and the retention strength table 101 may store retention strengths and retention strength groups corresponding to memory blocks and physical units indicated by page numbers.

Figure 11:
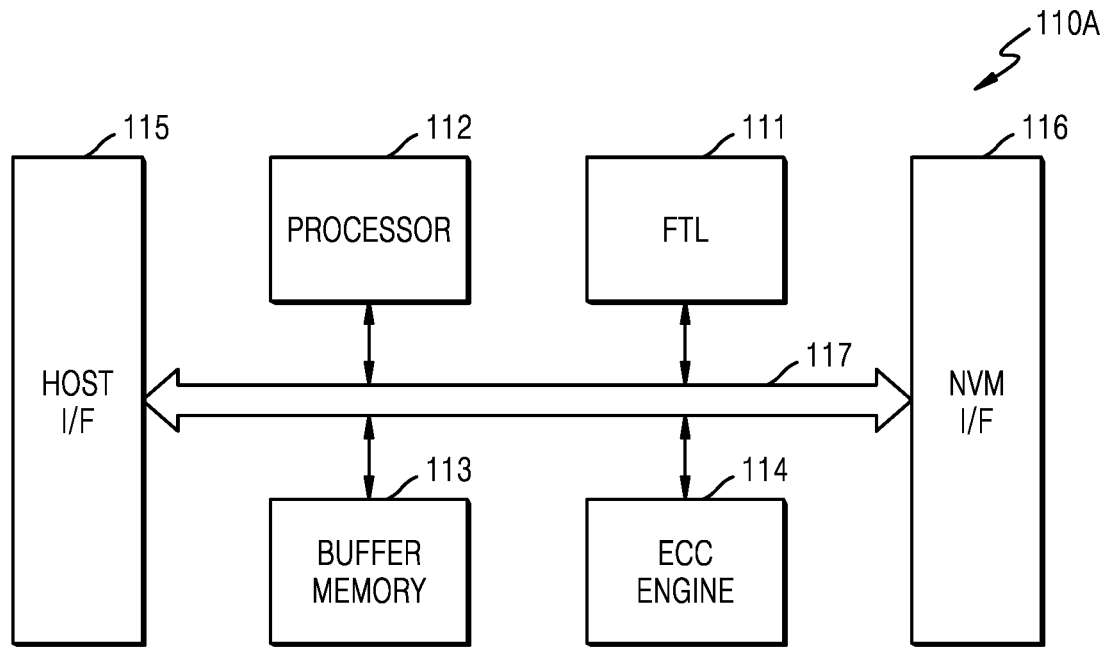
FIGS. 11 to 13 are diagrams showing storage controllers according to some embodiments of the inventive concept.

FIG. 11 is a diagram showing a storage controller 110A according to an example embodiment of the inventive concept in detail.

Referring to FIG. 11, the storage controller 110A may include a flash translation layer (FTL) 111, a processor 112, a buffer memory 113, an error correction code (ECC) engine 114, a host interface (I/F) 115, and a non-volatile memory interface 116, which may communicate with one another through a bus 117. The storage controller 110A may further include a working memory (e.g., an SRAM) into which the FTL 111 is loaded, and, as the processor 112 executes the FTL 111, a data write operation and a data read operation for the NVM 120 may be controlled. The storage controller 110A may correspond to an implementation example of the storage controller 110 of FIG. 1 and will be described below with reference to FIGS. 1 and 11 together.

The FTL 111 may perform various functions like address mapping, wear-leveling, and garbage collection. An address mapping operation is an operation of changing a logical address received from the host 200 into a physical address used to store data in the NVM 120. Wear-leveling is a technique for reducing/preventing excessive degradation of a particular block by allowing memory blocks in the NVM 120 to be uniformly used and may be, for example, implemented through firmware technology for balancing erase counts of physical blocks. Garbage collection is a technique for securing usable capacity in the NVM 120 by copying effective data of a memory block to a new block and then erasing the previous block.

According to the present embodiment, the allocator 111a, the hotness determiner 111b, and the physical unit manager 111c of FIG. 1 may be implemented as portions of the FTL 111. Accordingly, the FTL 111 may determine the hotness of the data DATA as a first hotness level from among a plurality of hotness levels based on the write request REQ received from the host 200, store retention strength information RS including retention strengths corresponding to the physical units PUs included in the NVM 120, and, based on the retention strength information RS, allocate a first physical unit from among the physical units PUs as a space for writing the data DATA.

The processor 112 may include a central processing unit (CPU) or a microprocessor and may control the overall operation of the storage controller 110A. In an embodiment, the processor 112 may be implemented as a multi-core processor, e.g., a dual-core processor or a quad-core processor. The buffer memory 113 may temporarily store data to be written to the NVM 120 or data read from the NVM 120. The buffer memory 113 may be a component provided in the storage controller 110A, but may also be provided outside the storage controller 110A.

The ECC engine 114 may perform an error detection and correction function for read data read from the NVM 120. In detail, the ECC engine 114 may generate parity bits regarding program data to be programmed to the NVM 120, and such parity bits may be stored in the NVM 120 together with the program data. When data is read from the NVM 120, the ECC engine 114 may correct an error of read data using parity bits read from the NVM 120 together with the read data and output error-corrected read data.

The host interface 115 may transmit and receive packets to and from the host 200. A packet transmitted from the host 200 to the host interface 115 may include a command or data to be programmed to the NVM 120, and a packet transmitted from the host interface 115 to the host 200 may include a response to the command or data read from the NVM 120. The non-volatile memory interface 116 may transmit data to be written to the NVM 120 to the NVM 120 or receive data read from the NVM 120. The non-volatile memory interface 116 may be implemented to comply with a standard protocol like the Toggle or the Open NAND Flash Interface (ONFI).

Figure 12:
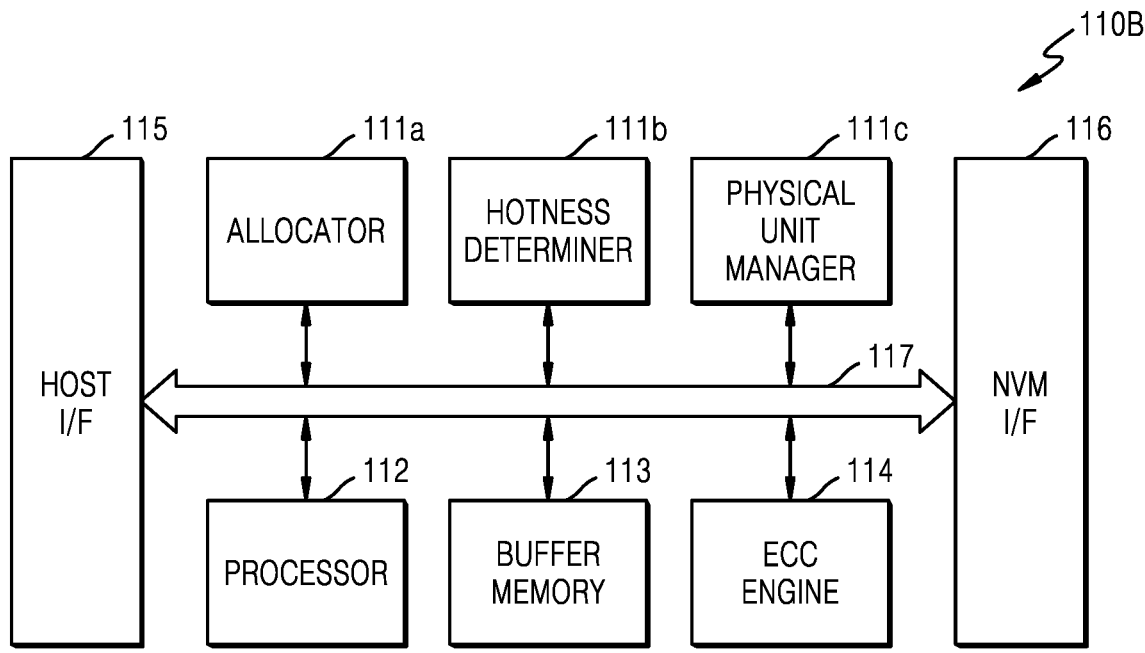

FIG. 12 is a diagram showing a storage controller 110B according to an example embodiment of the inventive concept in detail.

Referring to FIGS. 1 and 12 together, the storage controller 110B may include the allocator 111a, the hotness determiner 111b, the physical unit manager 111c, the processor 112, the buffer memory 113, the ECC engine 114, the host interface 115, and the non-volatile memory interface 116, which may communicate with one another through the bus 117. The storage controller 110B corresponds to a modified example of the storage controller 110A of FIG. 11, and thus, descriptions identical to those already given above may be omitted.

According to an example embodiment, the allocator 111a, the hotness determiner 111b, and the physical unit manager 111c may be implemented in software. For example, the NVM 120 may store program code, and, when power is applied to the storage device 100, the program code stored in the NVM 120 may be loaded into a working memory of the storage controller 110. As described above with reference to FIGS. 1 to 10, by executing program code loaded into the working memory, the processor 112 may control the NVM 120 to select a first physical unit based on the hotness of data DATA and retention strengths of physical units based on the write request REQ received from the host 200 and write the data DATA to the first physical unit.

However, the inventive concept is not limited thereto, and, according to an example embodiment, the allocator 111a, the hotness determiner 111b, and the physical unit manager 111c may be implemented in hardware. Also, according to an example embodiment, the allocator 111a, the hotness determiner 111b, and the physical unit manager 111c may be implemented in a combination of software and hardware. Furthermore, according to an example embodiment, at least one of the allocator 111a, the hotness determiner 111b, and the physical unit manager 111c may be implemented to be included in the non-volatile memory interface 116.

Figure 13:
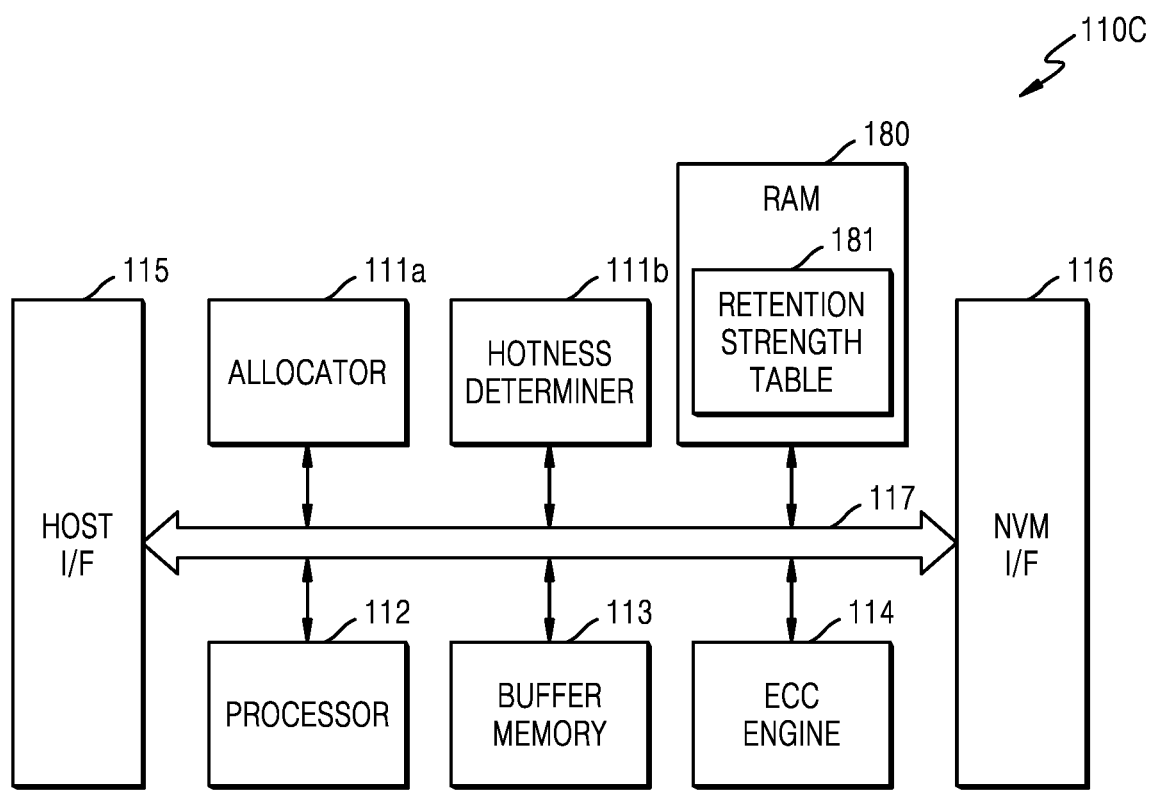

FIG. 13 is a diagram showing a storage controller 110C according to an example embodiment of the inventive concept in detail.

Referring to FIGS. 1 and 13 together, the storage controller 110C may include the allocator 111a, the hotness determiner 111b, random access memory (RAM) 180, the processor 112, the buffer memory 113, the ECC engine 114, the host interface 115, and the non-volatile memory interface 116, which may communicate with one another through the bus 117. The storage controller 110C corresponds to a modified example of the storage controller 110B of FIG. 12, and thus, descriptions identical to those already given above may be omitted.

According to the present embodiment, the RAM 180 may store a retention strength table 181, and the allocator 111a or the processor 112 may access the retention strength table 181 stored in the RAM 180 and select a suitable physical unit for writing data. For example, the retention strength table 181 may correspond to one of the retention strength table tables 81, 91, and 101 shown in FIGS. 8 to 10. For example, the RAM 180 may correspond to SRAM or DRAM, but is not limited thereto.

Figure 14:
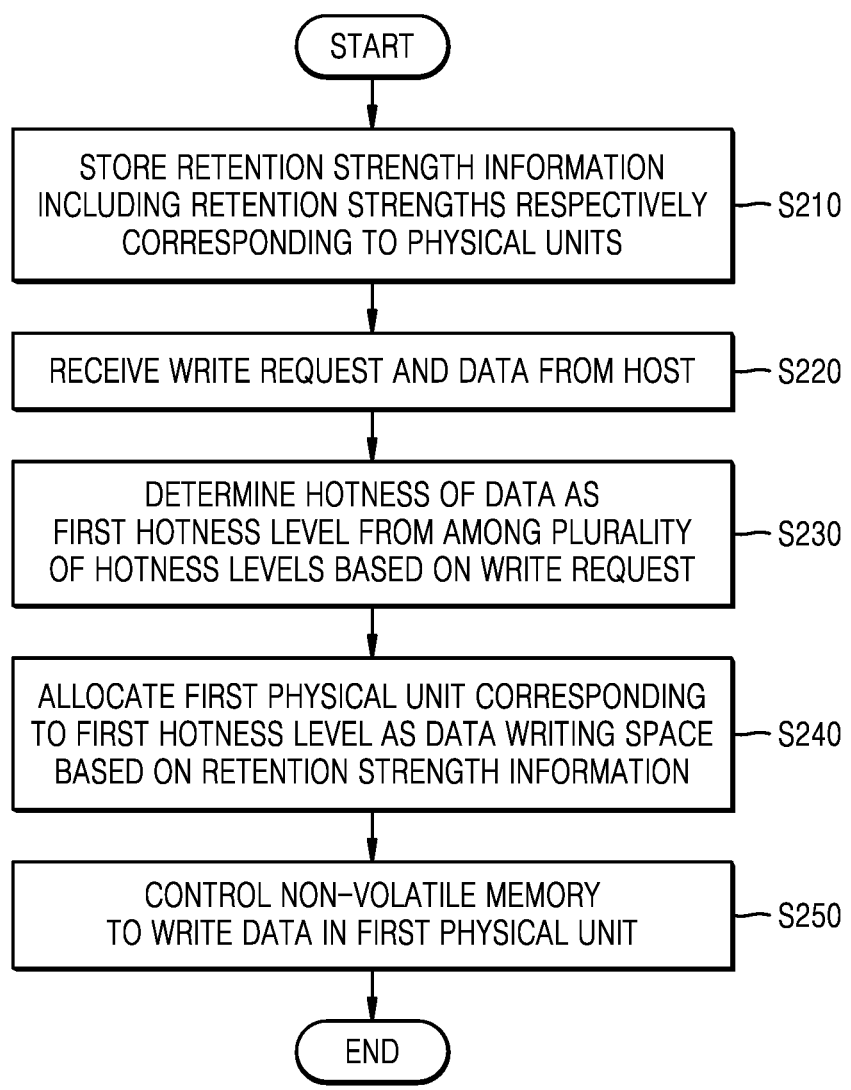
FIG. 14 is a flowchart of an operating method of a storage controller according to an embodiment of the inventive concept.

FIG. 14 is a flowchart of an operating method of a storage controller 110 according to an embodiment of the inventive concept.

Referring to FIGS. 1 and 14 together, in operation S210, the storage controller 110 stores retention strength information including retention strengths respectively corresponding to the physical units PUs of the NVM 120. The physical units PUs may have different retention strengths due to process variations. Therefore, the retention strengths may be obtained/determined in advance before the assembly of the storage device 100, stored in some portions of the NVM 120, and loaded into the storage controller 110 when power is applied to the storage device 100.

In operation S220, the storage controller 110 receives a write request REQ and data DATA from the host 200. For example, a host interface (I/F 115 of FIG. 11) may receive the write request REQ and the data DATA from the host 200. In operation S230, the storage controller 110 determines the hotness of the data DATA as a first hotness level, which is one of a plurality of hotness levels, based on the write request REQ. For example, the hotness determiner 111b may determine/classify the hotness of the data DATA based on a logical address included in the write request REQ.

In operation S240, the storage controller 110 allocates the first physical unit corresponding to the first hotness level as a data writing space based on the retention strength information. For example, the allocator 111a may allocate the first physical unit as the data writing space based on the retention strength information RS received from the physical unit manager 111c. In operation S250, the storage controller 110 controls the NVM 120 to write data to the first physical unit. For example, the non-volatile memory interface 116 of FIG. 11 may transmit a physical address and data corresponding to the first physical unit to the NVM 120.

Figure 15:
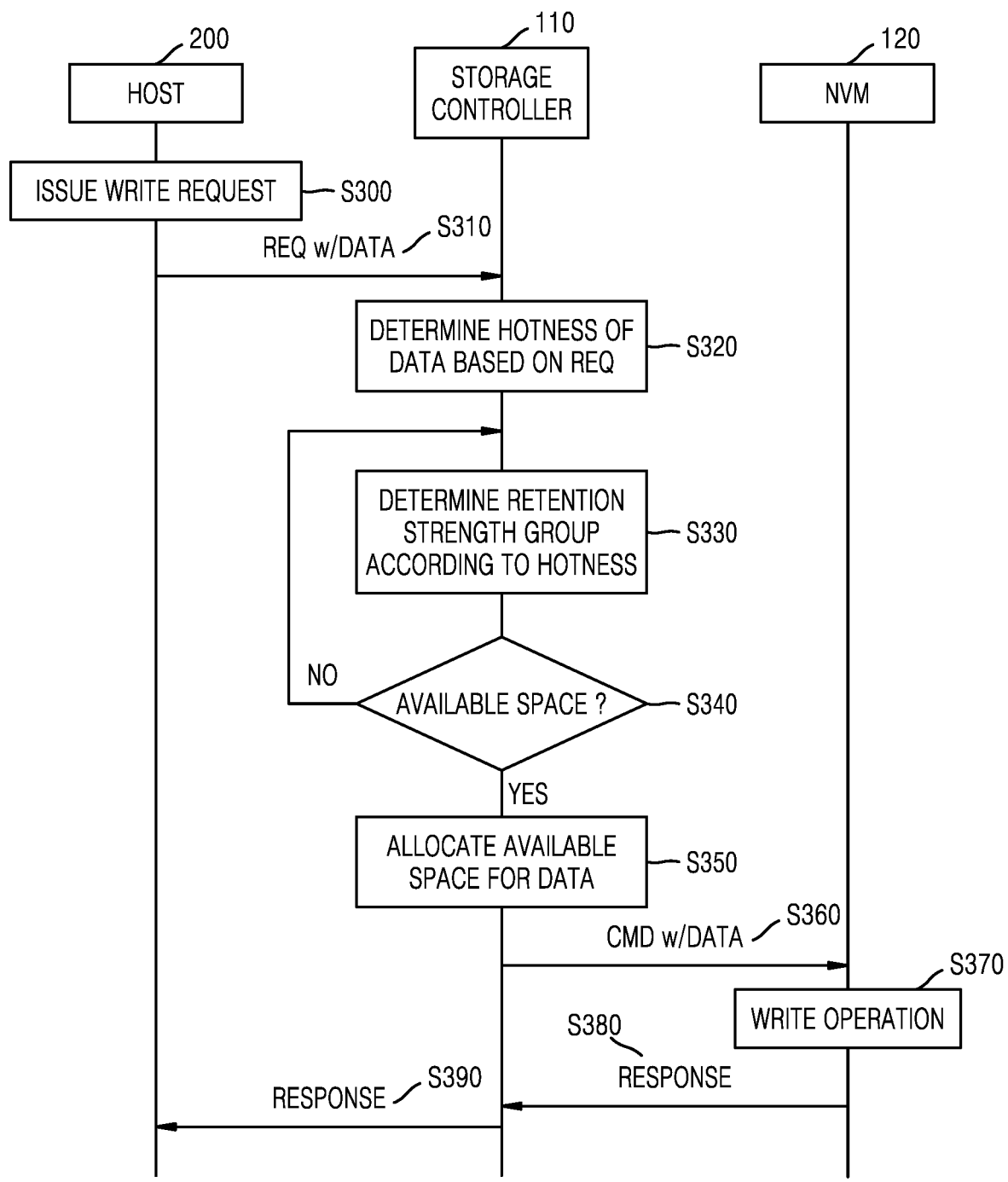
FIG. 15 is a flowchart of an operating method between a host, a storage controller, and an non-volatile memory (NVM) according to an example embodiment of the inventive concept.

FIG. 15 is a flowchart of an operating method between the host 200, the storage controller 110, and the NVM 120 according to an example embodiment of the inventive concept.

Referring to FIG. 15, in operation S300, the host 200 generates/issues a write request REQ. In operation S310, the host 200 transmits the write request REQ and data DATA to the storage controller 110. In operation S320, the storage controller 110 determines the hotness of the data DATA based on the write request REQ. In operation S330, the storage controller 110 determines a retention strength group according to the determined hotness.

In operation S340, the storage controller 110 determines whether there is an available space, i.e., an empty space, in the determined retention strength group. For example, the allocator 111a may determine whether there is a free physical unit from among physical units included in the determined retention strength group. When there is an available space, in operation S350, the storage controller 110 allocates the available space for writing data.

In operation S360, the storage controller 110 transmits a command CMD and the data DATA to the NVM 120. In operation S370, the NVM 120 performs a write operation. In operation S380, the NVM 120 transmits a response message indicating that the write operation is completed to the storage controller 110. In operation S390, the storage controller 110 transmits a response message indicating that the write operation is completed to the host 200.

Figure 16:
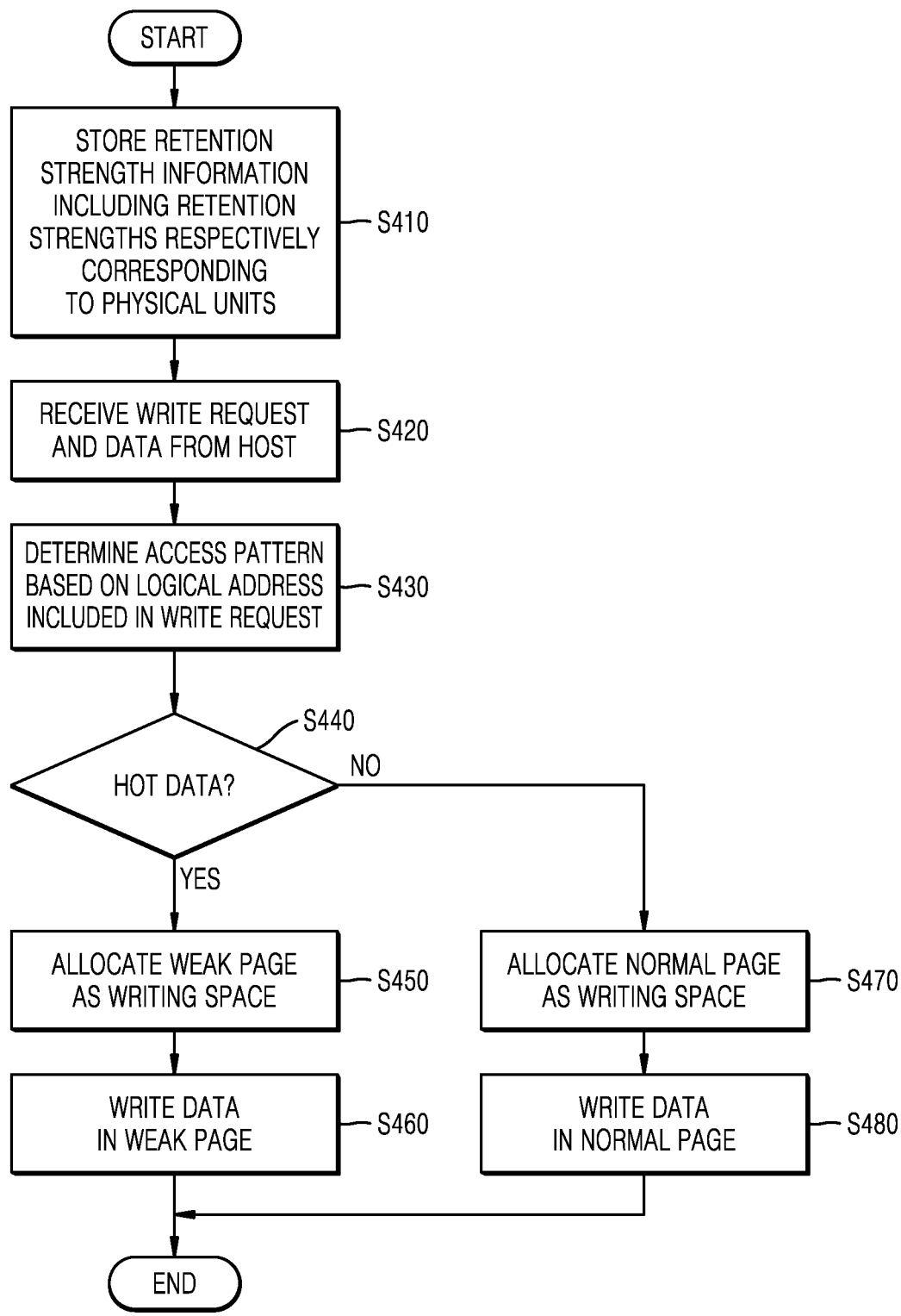
FIGS. 16 and 17 are flowcharts of operating methods of a storage device according to some embodiments of the inventive concept.

FIG. 16 is a flowchart of an operating method of the storage device 100 according to an embodiment of the inventive concept.

Referring to FIGS. 1 and 16 together, in operation S410, the storage device 100 stores the retention strength information RS including retention strengths respectively corresponding to the physical units Pus. In operation S420, the storage device 100 receives a write request REQ and data DATA from the host 200. In operation S430, the storage device 100 determines an access pattern based on a logical address included in the write request REQ. According to an example embodiment, the access pattern may be referred to as a data access pattern, a memory access pattern, or an input/output access pattern.

In operation S440, the storage device 100 determines whether the data DATA corresponds to hot data. When the data DATA is determined as hot data, in operation S450, the storage device 100 allocates a weak page as a writing space. In operation S460, the storage device 100 writes the data DATA in the weak page. When the data DATA is not determined as hot data, in operation S470, the storage device 100 allocates a normal page as a writing space. In operation S480, the storage device 100 writes the data DATA in the normal page. However, the inventive concept is not limited thereto, and, when it is determined that the data DATA is not hot data, the storage device 100 may allocate a strong page as a writing space and may write the data DATA in the strong page.

Figure 17:
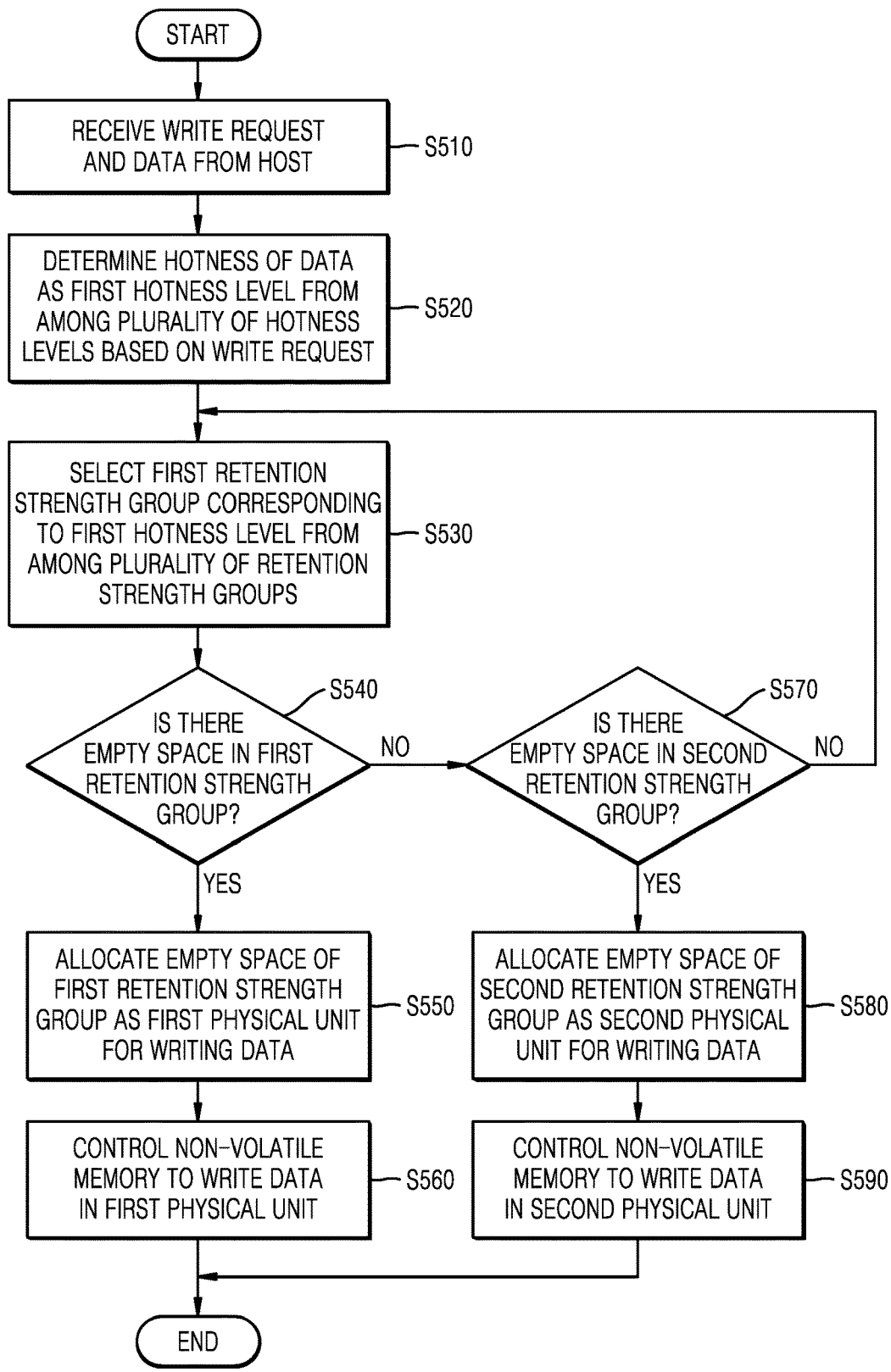

FIG. 17 is a flowchart of an operating method of the storage controller 110 according to an embodiment of the inventive concept.

Referring to FIG. 17, in operation S510, the storage controller 110 receives a write request REQ and data DATA from the host 200. In operation S520, the storage controller 110 determines the hotness of the data DATA as a first hotness level, which is one of a plurality of hotness levels, based on the write request REQ. In operation S530, the storage controller 110 selects a first retention strength group corresponding to the first hotness level from among a plurality of retention strength groups.

In operation S540, the storage controller 110 determines whether there is an empty space in the first retention strength group. In detail, the allocator 111a may determine whether there is an empty space, that is, a free physical unit, from among a plurality of physical units corresponding to the first retention strength group based on the retention strength information RS. When it is determined that there is an empty space in the first retention strength group, operation S550 is performed. Otherwise, operation S570 is performed. In operation S550, the storage controller 110 allocates an empty space of the first retention strength group as a first physical unit for writing data. In operation S560, the storage controller 110 controls the NVM 120 to write the data DATA to the first physical unit.

In operation S570, the storage controller 110 determines whether there is an empty space in a second retention strength group. Here, the second retention strength group may include physical units having higher retention strengths than those of the physical units of the first retention strength group. In other words, the physical units included in the second retention strength group may be stronger than the physical units included in the first retention strength group, thereby exhibiting higher retention strengths. When it is determined that there is an empty space in the second retention strength group, operation S580 is performed. In operation S580, the storage controller 110 allocates an empty space of the second retention strength group, that is, a free physical unit, as a second physical unit for writing data. In operation S590, the storage controller 110 controls the NVM 120 to write the data DATA to the second physical unit.

In addition, when there is no empty space in the second retention strength group, operation S530 may be performed again. However, the inventive concept is not limited thereto, and, when there is no empty space in the second retention strength group, the storage controller 110 may determine whether there is an empty space in a third retention strength group. Here, the third retention strength group may include physical units having higher retention strengths than those of the physical units of the second retention strength group. In this case, the above-described operations may be repeated according to the number of retention strength groups.

Figure 18:
FIG. 18 is a diagram showing improvement of retention time according to an example embodiment of the inventive concept.

FIG. 18 is a diagram showing improvement of retention time according to an example embodiment of the inventive concept.

Referring to FIGS. 1 and 18 together, for example, a memory block BLKa of the NVM 120 may include QLCs, and thus, each word line may correspond to four pages. For example, a first page PAGE1 may correspond to the least significant bit (LSB) page, a second page PAGE2 may correspond to the second LSB page, and a third page PAGE3 may correspond to the second more significant bit (MSB) page, and a fourth page PAGE4 may correspond to the MSB page.

A first table 181 represents retention strengths of physical units included in the memory block BLKa and may be obtained/determined through post-packaging evaluation of the NVM 120 and used during the runtime of the storage device 100. For example, the retention strength of the first page PAGE1 corresponding to a first word line WL1 is 40, and thus, the time to retain data before reclaiming may correspond to 40.

According to an example embodiment, the retention strengths of the physical units of the memory block BLKa may be included in one of three retention strength groups. For example, fifth and sixth word lines WL5 and WL6 having relatively low retention strengths in the memory block BLKa may be defined as weak word lines and included in a first retention strength level group. Therefore, first to fourth pages PAGE1 to PAGE4 corresponding to each of the fifth and sixth word lines WL5 and WL6 may be defined as weak pages and may be included in the first retention strength group. Moreover, first and second word lines WL1 and WL2 having relatively high retention strengths in the memory block BLKa may be defined as strong word lines and included in a second retention strength level group. Therefore, first to fourth pages PAGE1 to PAGE4 corresponding to each of the first and second word lines WL1 and WL2 may be defined as strong pages and may be included in the second retention strength group. In some embodiments, third, fourth, seventh, and eighth word lines WL3, WL4, WL7, and WL8 of the memory block BLKa may be defined as normal word lines and included in a third retention strength group. Therefore, the first to fourth pages PAGE1 to PAGE4 corresponding to each of the third, fourth, seventh, and eighth word lines WL3, WL4, WL7, and WL8 may be defined as normal pages and may be included in the third retention strength group.

According to an example embodiment, the retention strengths of the physical units of the memory block BLKa may be included in one of four retention strength groups. For example, the fifth and sixth word lines WL5 and WL6 may be included in the first retention strength group, the first and second word lines WL1 and WL2 may be included in the second retention strength group, third and fourth word lines WL3 and WL4 may be included in the third retention strength group, and seventh and eighth word lines WL7 and WL8 may be included in a fourth retention strength group.

A second table 182 shows reclaim times according to a comparative example for the embodiments of the inventive concept. When a data storage space is allocated regardless of data hotness, because the retention strength of the first page PAGE1 of a fifth word line WL5 is 10, for example, when 10 hours is elapsed after data is written in the first page PAGE1 of the fifth word line WL5, a reclaim may occur for the memory block BLKa.

A third table 183 indicates reclaim times according to example embodiments of the inventive concept. According to example embodiments of the inventive concept, hot data having a high hotness level may be stored in a physical unit having a low retention strength. For example, when hot data is to be stored in the first to fourth pages PAGE1 to PAGE4 of the fifth and sixth word lines WL5 and WL6, data stored in the first to fourth pages PAGE1 to PAGE4 of the fifth and sixth word lines WL5 and WL6 before reclaims for the first to fourth pages PAGE1 to PAGE4 of the fifth and sixth word lines WL5 and WL6 occur may be invalidated. Therefore, reclaim may not occur for the first to fourth pages PAGE1 to PAGE4 of the fifth and sixth word lines WL5 and WL6.

In the memory block BLKa, a physical unit having the lowest retention strength except for the fifth and sixth word lines WL5 and WL6 may be the first page PAGE1 of a seventh word line WL7. Therefore, in the memory block BLKa, because the retention strength of the first page PAGE1 of the seventh word line WL7 is 20, for example, when 20 hours is elapsed after data is written in the first page PAGE1 of the seventh word line WL7, a reclaim may occur for the memory block BLKa. Accordingly, according to the third table 183, a time point at which a reclaim occurs may be delayed as compared to the second table 182.

Figure 19:
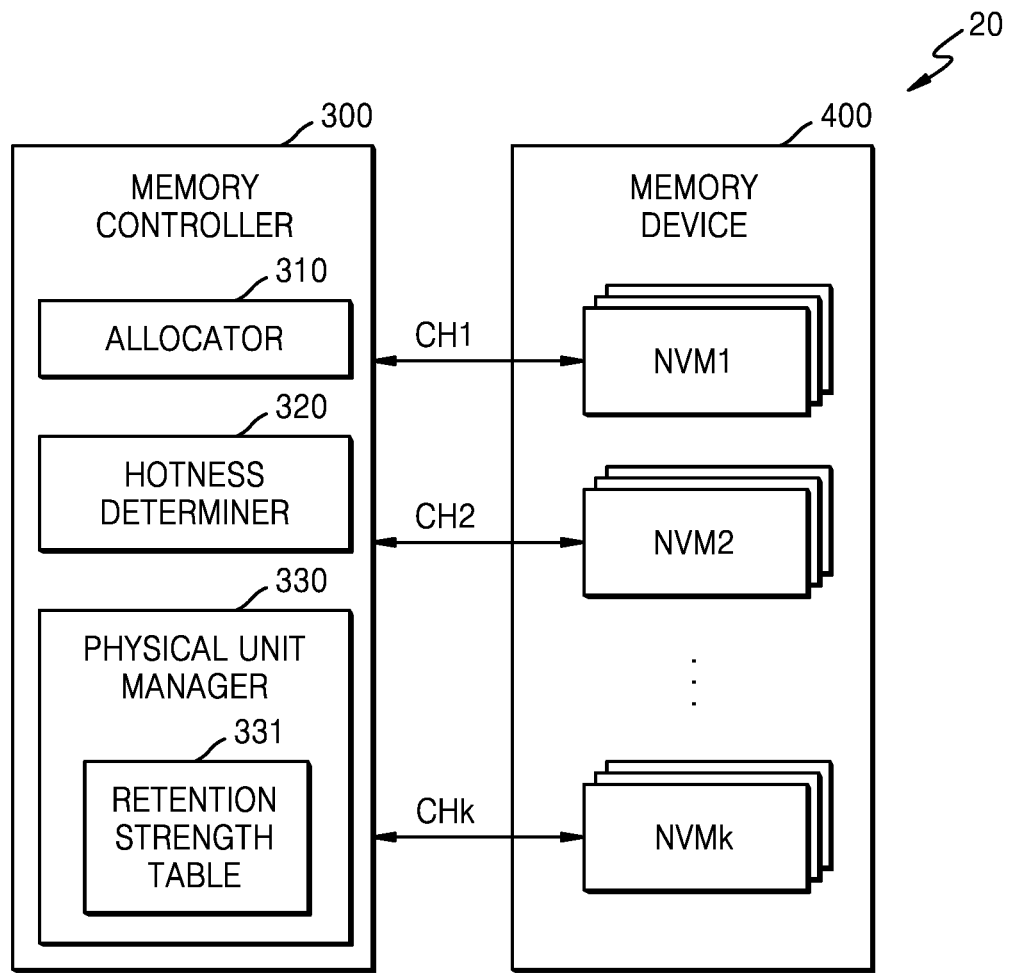
FIG. 19 is a block diagram showing a storage device according to an embodiment of the inventive concept.

FIG. 19 is a block diagram showing a storage device 20 according to an embodiment of the inventive concept.

Referring to FIG. 19, the storage device 20 may include a memory controller 300 and a memory device 400. The storage device 20 may support a plurality of channels CH1 to CHk, and the memory device 400 and the memory controller 300 may be connected through the channels CH1 to CHk (k is a positive integer). The memory controller 300 may control the overall operation of the memory device 400. The memory controller 300 may control each of non-volatile memory devices NVM1, NVM2, and NVMk connected to the channels CH1 to CHk by transmitting signals through the channels CH1 to CHk.

The memory device 400 may include a plurality of non-volatile memory devices NVM1, NVM2, and NVMk. For example, at least one of the non-volatile memory devices NVM1, NVM2, and NVMk may correspond to the NVM 120 of FIG. 1. Non-volatile memory devices NVM1 may be connected to a first channel CH1, non-volatile memory devices NVM2 may be connected to a second channel CH2, and non-volatile memory devices NVMk may be connected to a k-th channel CHk. In an example embodiment, the non-volatile memory devices NVM1, NVM2, and NVMk may each be implemented as an arbitrary memory unit capable of operating according to an individual command from the memory controller 300. For example, the non-volatile memory devices NVM1, NVM2, and NVMk may each be implemented as a chip or a die, but the inventive concept is not limited thereto.

The memory controller 300 may transmit and receive signals to and from the memory device 400 through the channels CH1 to CHk. For example, the memory controller 300 may transmit commands, addresses, and data to the memory device 400 or receive data from the memory device 400 through the channels CH1 to CHk. Through each channel, the memory controller 300 may select one of the non-volatile memory devices NVM1, NVM2, and NVMk connected to a corresponding channel and transmit and receive signals with a selected non-volatile memory device. Also, the memory controller 300 may transmit and receive signals to and from the memory device 400 in parallel through different channels. For example, the memory controller 300 may transmit a command to the memory device 400 through a second channel CH2 while another command is being transmitted to the memory device 400 through a first channel CH1.

The memory controller 300 may include an allocator 310, a hotness determiner 320, and a physical unit manager 330, and the physical unit manager 330 stores a retention strength table 331. For example, the retention strength table 331 may correspond to one of the retention strength tables 81, 91, and 101 shown in FIGS. 8 to 10. The allocator 310, the hotness determiner 320, and the physical unit manager 330 may correspond to the allocator 111a, the hotness determiner 111b, and the physical unit manager 111c shown in FIG. 1, respectively, and may be implemented to be substantially identical thereto. Accordingly, the embodiments described above with reference to FIGS. 1 to 18 may be applied to the present embodiment.

Figure 20:
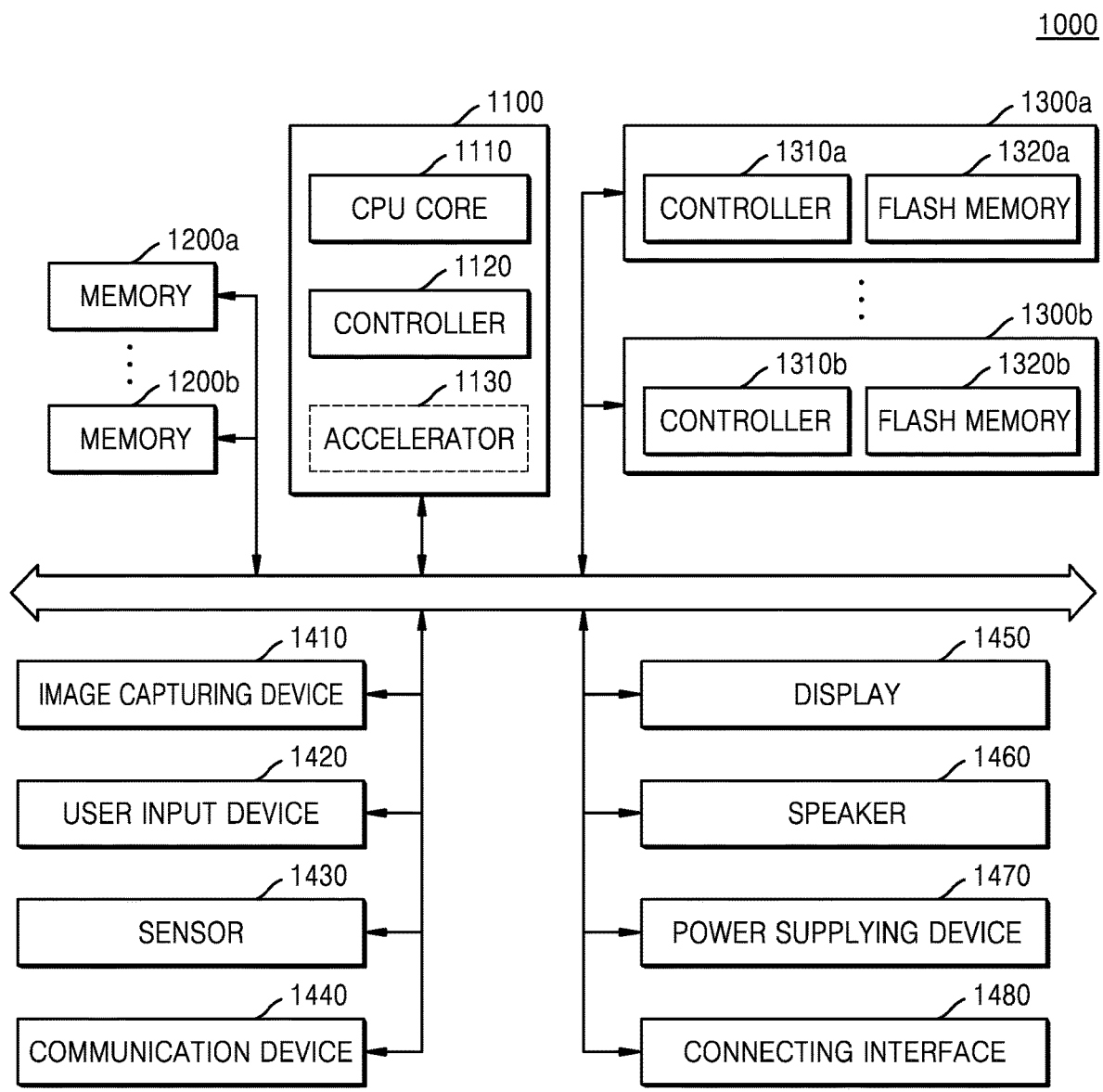
FIG. 20 is a block diagram showing a system to which a storage device according to an embodiment of the inventive concept is applied.

FIG. 20 is a diagram of a system 1000 to which a storage device is applied, according to an embodiment. The system 1000 of FIG. 20 may be a mobile system, such as a portable communication terminal (e.g., a mobile phone), a smartphone, a tablet personal computer (PC), a wearable device, a healthcare device, or an Internet of things (JOT) device. However, the system 1000 of FIG. 19 is not necessarily limited to the mobile system and may be a PC, a laptop computer, a server, a media player, or an automotive device (e.g., a navigation device).

Referring to FIG. 20, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an AP.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVMs (Non-Volatile Memories) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as UFS, eMMC, or NVMe, is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electrical signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

While the inventive concept has been particularly shown and described with reference to embodiments thereof, it will be understood that various changes in form and details may be made therein without departing from the scope of the following claims.

What is claimed is:

1. A storage device comprising:
a non-volatile memory comprising a plurality of memory blocks each including a first physical unit and a second physical unit, the first physical unit being associated with a first retention value and the second physical unit being associated with a second retention value different from the first retention value; and
a storage controller configured to receive a write request and data from a host, select the first physical unit from the first physical unit and the second physical unit based, at least in part, on a particular measure of the data associated with frequency of access of said data, the first retention value, and the second retention value, and wherein the storage controller is further configured to control the non-volatile memory to write the data to the first physical unit,
wherein the first retention value is based at least in part on a first time duration associated with the first physical unit, and
wherein the first time duration is based at least in part on time lapsed between a first data storage operation and a first data release operation subsequent to the first data storage operation,
wherein the second retention value is based at least in part on a second time duration associated with the second physical unit,
wherein the second time duration is based at least in part on time lapsed between a second data storage operation and a second data release operation subsequent to the second data storage operation,
wherein the first retention value is greater than the second retention value, and
wherein the first retention value is associated with a first frequency of access that is less than a second frequency of access associated with the second retention value.

2. The storage device of claim 1,
wherein, in response to the particular measure, the storage controller is configured to select the first physical unit or the second physical unit, for allocation of the data thereto.

3. The storage device of claim 1, wherein the first and second physical units comprise pages.

4. The storage device of claim 1, wherein the first and second physical units comprise word lines.

5. The storage device of claim 1, wherein the storage controller comprises:
a hotness determiner configured to determine a hotness of the data comprising the particular measure of the data associated with frequency of access of said data as a first hotness level from among a plurality of hotness levels based on the write request;
a physical unit manager configured to store retention strength information including a first and second retention values respectively corresponding to the first and second physical units included in each of the memory blocks; and
an allocator configured to allocate the first physical unit corresponding to the first hotness level from among the first and second physical units as a writing space of the data based on the retention strength information.

6. The storage device of claim 5, wherein the physical unit manager is configured to store each of the first and second retention values as one of a plurality of retention strength groups.

7. The storage device of claim 6,
wherein the allocator is configured to select a free physical unit of the first and second physical units in which data is not stored from a first retention strength group corresponding to the first hotness level from among the retention strength groups, and
wherein the allocator is configured to allocate the free physical unit as the first physical unit.

8. The storage device of claim 7,
wherein the retention strength groups further comprise a second retention strength group having a higher retention level than that of the first retention strength group, and, wherein, when no free physical unit is in the first retention strength group, the allocator is configured to select the first physical unit from the second retention strength group.

9. The storage device of claim 6, wherein the retention strength groups comprise three or more retention strength groups.

10. The storage device of claim 5, wherein the hotness levels comprise three or more hotness levels.

11. The storage device of claim 5, wherein the hotness determiner is configured to determine that the data has the first hotness level by counting an access frequency to a logical address included in the write request.

12. The storage device of claim 5, wherein the hotness determiner is configured to determine that the data has the first hotness level by applying a hash function or a bloom filter to the write request.

13. The storage device of claim 1, wherein the first and second retention values are obtained through post-packaging evaluation of the non-volatile memory.

14. The storage device of claim 1, wherein the first and second retention values are determined based on respective physical locations of the first and second physical units in the non-volatile memory.

15. The storage device of claim 1, wherein the first and second retention values are determined based on respective operating voltage conditions for the first and second physical units.

16. An operating method of a storage controller for controlling a non-volatile memory, the operating method comprising:
    storing retention strength information including a first retention value and a second retention value different from the first retention value respectively corresponding to a first physical unit and a second physical unit included in the non-volatile memory;
    receiving a write request and data from a host;
    determining a particular measure of the data associated with frequency of access of said data as a first hotness level from among a plurality of hotness levels based on the write request; and
    allocating the first physical unit corresponding to the first hotness level from among the first and second physical units as a writing space of the data based on the retention strength information,
    wherein the first retention value and the second retention value are determined according to physical locations of the respective first and second physical units based on relative distances from at least one of an edge portion of a cell region, a substrate, a string select line and/or a ground select line.

17. The operating method of claim 16, further comprising controlling the non-volatile memory to write the data in the first physical unit.

18. The operating method of claim 16,
    wherein the storing of the retention strength information comprises storing each of the first retention value and the second retention value as one of a plurality of retention strength groups including a first retention strength group and a second retention strength group,
    wherein the allocating of the first physical unit as the writing space of the data comprises:
        allocating a free physical unit, in which data is not stored, in the first retention strength group corresponding to the first hotness level as the first physical unit; and
        selecting the first physical unit from the second retention strength group when no free physical unit is in the first retention strength group, and
    wherein the second retention strength group has a retention value greater than that of the first retention strength group.

19. The operating method of claim 16, wherein the determining of the particular measure of the data associated with frequency of access of said data as the first hotness level comprises at least one of:
    determining that the data has the first hotness level by counting an access frequency to a logical address included in the write request; and
    determining that the data has the first hotness level by applying a hash function or a bloom filter to the write request.

20. A storage controller for controlling a non-volatile memory, the storage controller comprising:
    a host interface configured to receive a write request and data from a host;
    a hotness determiner configured to determine hotness of the data comprising a particular measure of the data associated with frequency of access of said data as a first hotness level from among a plurality of hotness levels based on the write request;
    a physical unit manager configured to store retention strength information including a first retention value and a second retention value different from the first retention value respectively corresponding to a first physical unit and a second physical unit included in the non-volatile memory, the first physical unit being associated with the first retention value and the second physical unit being associated with the second retention value different from the first retention value; and
    an allocator configured to allocate the first physical unit corresponding to the first hotness level from among the first and second physical units as a writing space of the data based on the retention strength information,
    wherein the first retention value is based at least in part on a first time duration associated with the first physical unit, and
    wherein the first time duration is based at least in part on time lapsed between a first data storage operation and a first data release operation subsequent to the first data storage operation,
    wherein the second retention value is based at least in part on a second time duration associated with the second physical unit,
    wherein the second time duration is based at least in part on time lapsed between a second data storage operation and a second data release operation subsequent to the second data storage operation,
    wherein the first retention value is greater than the second retention value, and
    wherein the first retention value is associated with a first frequency of access that is less than a second frequency of access associated with the second retention value.

* * * * *